May 5, 1959          B. V. STILLER          2,885,115

MERCHANDISE SELECTING SYSTEM

Filed July 15, 1953          6 Sheets-Sheet 1

Inventor:
Bruno V. Stiller
By Kent W. Worrell
Atty.

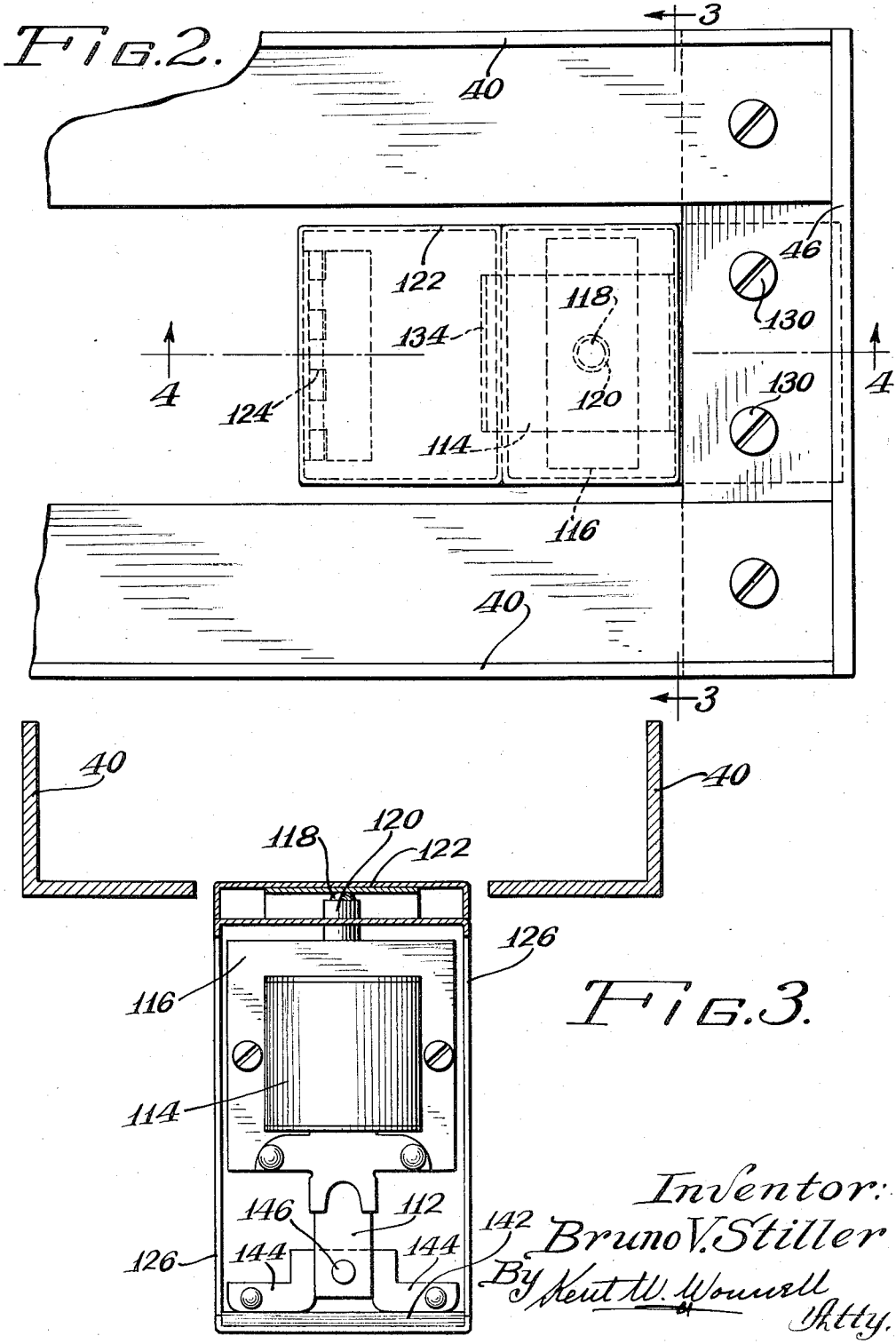

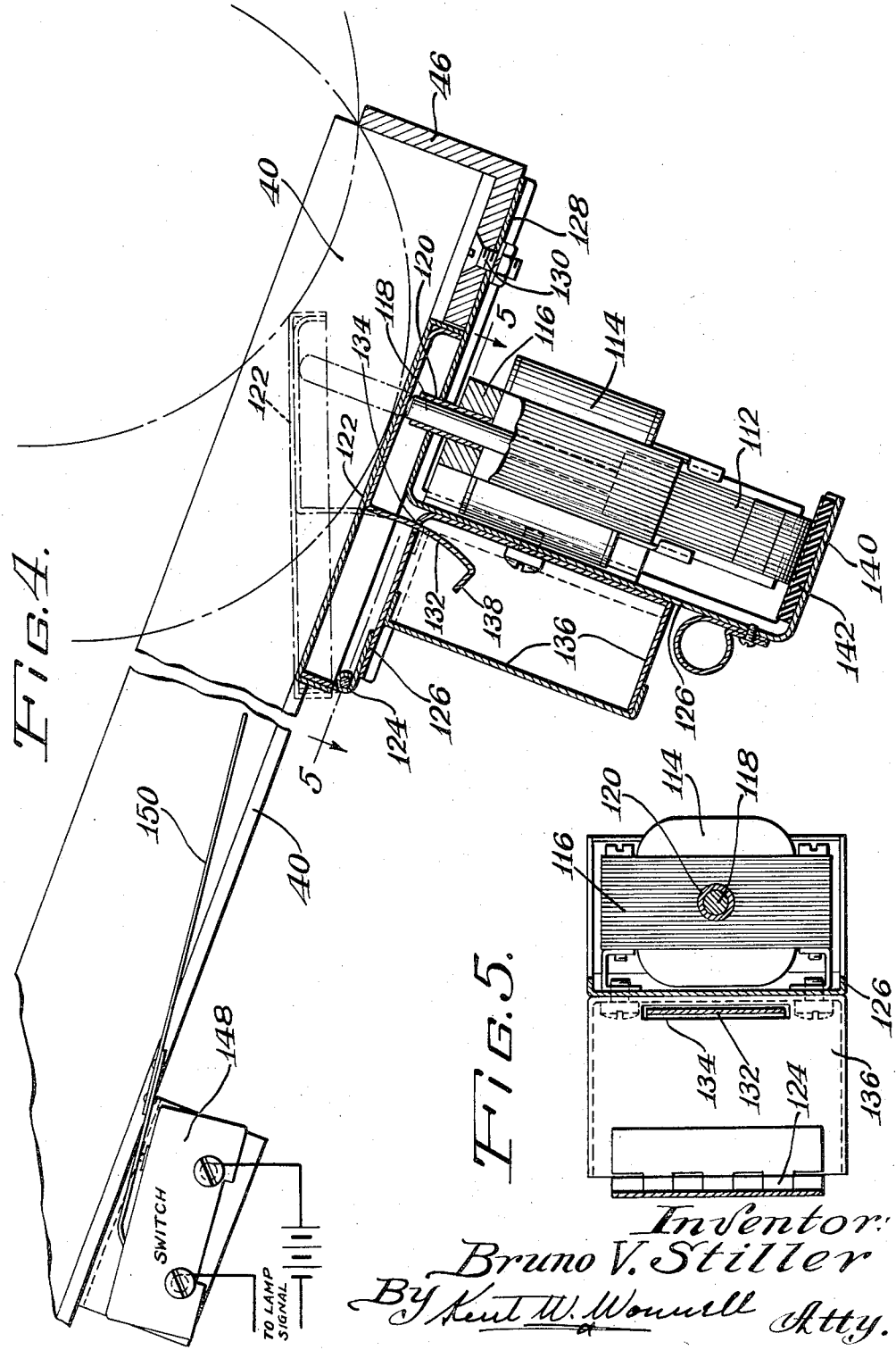

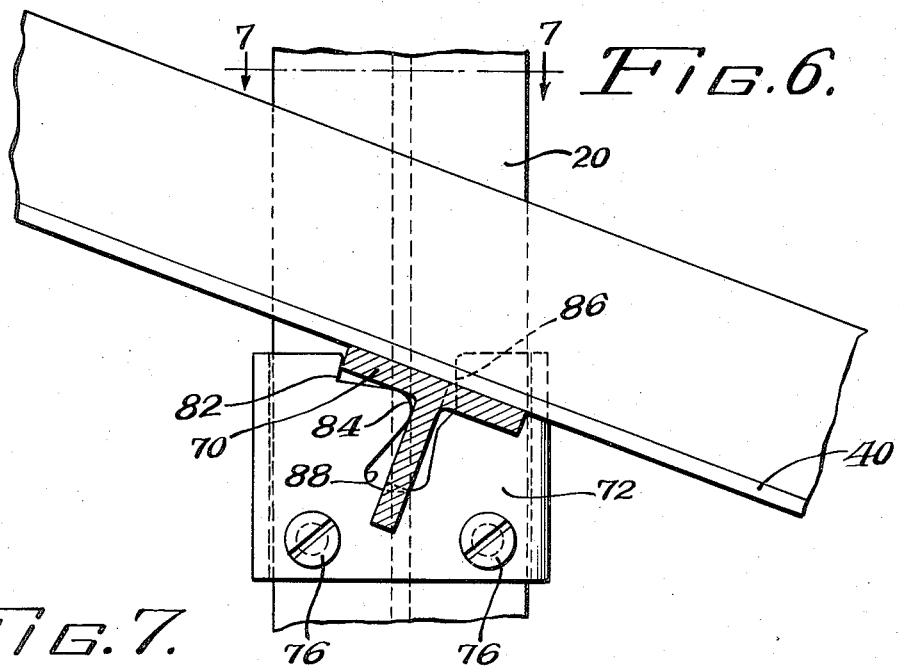
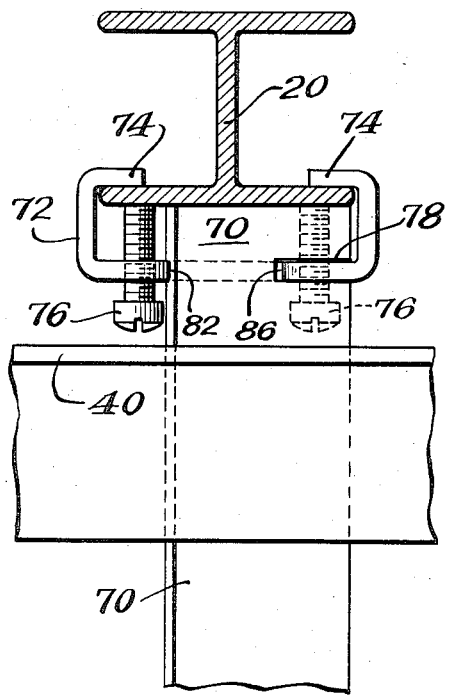
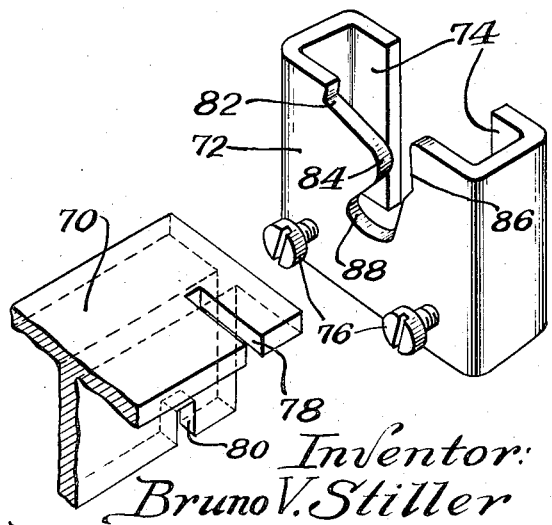

May 5, 1959 B. V. STILLER 2,885,115
MERCHANDISE SELECTING SYSTEM
Filed July 15, 1953 6 Sheets-Sheet 5
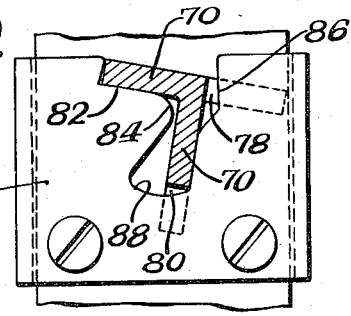
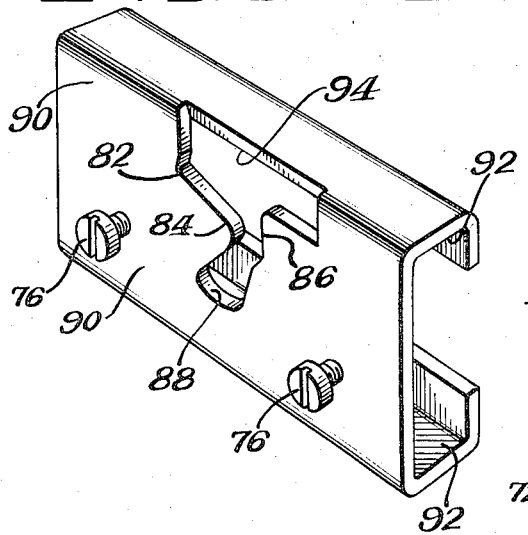
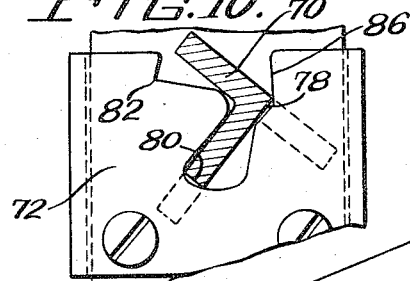
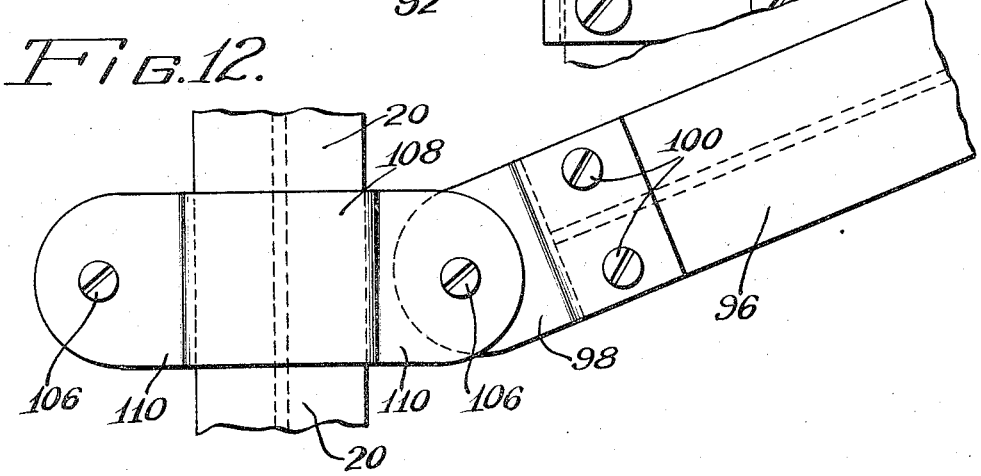
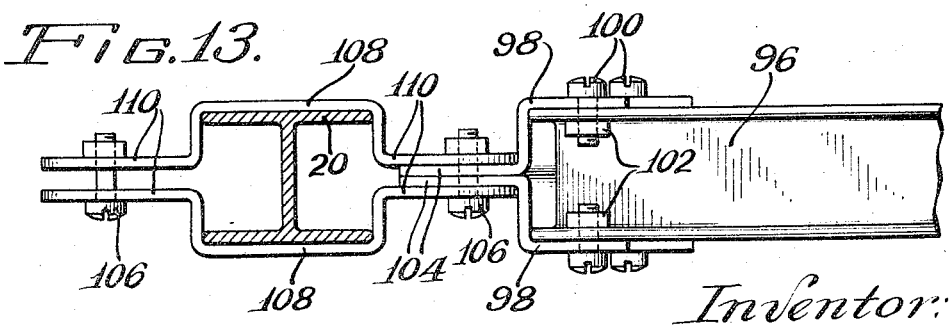
Inventor:
Bruno V. Stiller
By Kent W. Wonnell Atty.

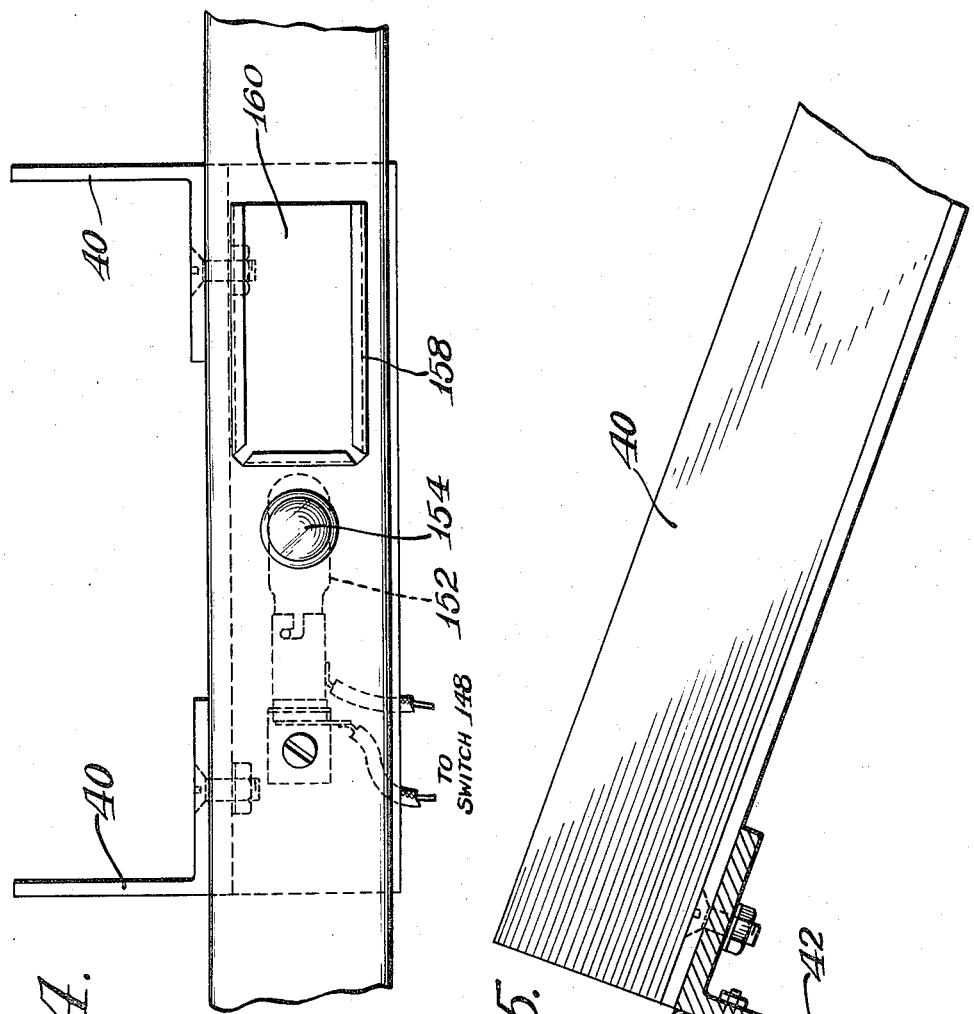

United States Patent Office 2,885,115
Patented May 5, 1959

2,885,115

MERCHANDISE SELECTING SYSTEM

Bruno V. Stiller, Deerfield, Ill.

Application July 15, 1953, Serial No. 368,093

7 Claims. (Cl. 221—129)

This invention relates to a remote controlled merchandise delivery system in which a large number of articles for sale or distribution are contained in delivery chutes from where they are discharged from any distance by electrically operated kick-out means. The system may be employed for filling orders from a remote supply by the operation of electro-responsive devices for discharging selected units from delivery chutes into a common conveyor which delivers them to a common collection point. This system may be employed, for example, in a retail store or it may be utilized for assembling merchandise from a warehouse for delivery to customers.

An important object of the invention is to provide a compact storage system for containing a variety of different articles to be selected from a supply of stock.

A further object of the invention is to provide improved means for erecting the discharge chutes from which the articles are selected.

A still further object of the invention is to provide a chute structure which may be readily built and the parts connected at different angles depending upon the nature of the goods to be dispensed.

Another object of the invention is to provide an electrically operated ejection unit which is suitable for operation for small articles and also for large articles without structural change.

A still further object of the invention is to provide a gravity chute storage structure which may be set up in a small space and combined with conveying means and with containers for frozen articles and packages.

A further object of the invention is to provide a chute structure which is assembled in compact relation of standard metal angle supports adapted to be changed in inclination depending upon the articles dispensed and providing means for warning that the articles in any chute are approaching exhaustion therefrom.

Other objects of the invention will appear in the specification and will be apparent from the accompanying drawings in which, Fig. 1 is a side elevation of a merchandise distributing chute system having chutes of different lengths and at different angles arranged in compact overhead relation for delivery to a common conveyor.

Fig. 2 is an enlarged view of an electrical kick-out for merchandise at the end of a chute.

Fig. 3 is a part sectional view of the structure shown in Fig. 2 as taken on the line 3—3 of Fig. 2.

Fig. 4 is a sectional view showing the kick-out device as taken on the line 4—4 of Fig. 2; and Fig. 5 is a sectional plan view of the kick-out device as taken on the line 5—5 of Fig. 4.

Fig. 6 is a side elevation of a chute support.

Fig. 7 is a plan view as taken on the line 7—7 of Fig. 6.

Fig. 8 is a perspective view showing one of the chute supports and the end of an angle structure for variable conection therewith.

Fig. 9 is a side elevation showing the angle bar structure of Fig. 8 in one angular position.

Fig. 10 is a side elevation showing the angle bar of Fig. 8 in another angular relation.

Fig. 11 is a perspective view of an angle bar notch in a clamping plate of a different form.

Fig. 12 is a detail side elevation and Fig. 13 is a sectional view of a bracket for attaching and supporting the brace of the chute structure to a fixed upright support.

Fig. 14 is an elevational view and Fig. 15 is a sectional view of a single lamp at the upper end of one of the merchandise discharge chutes.

Figure 1:
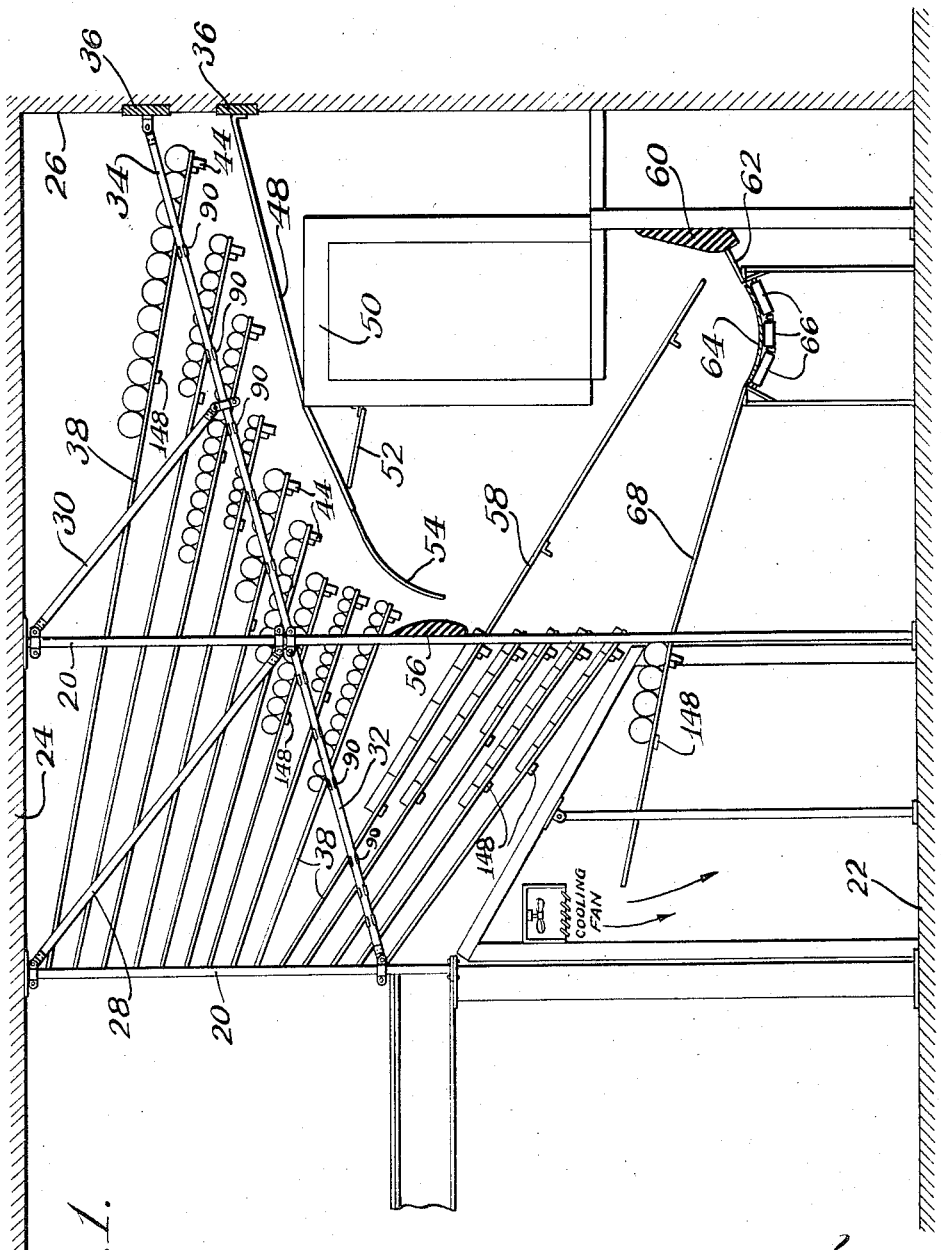

This invention relates to a compact arrangement of delivery chutes for various items of merchandise which are discharged by gravity from an inclined chute by means of an electrically operated kick-out unit at the bottom of each chute. It also comprises apparatus for setting up such delivery chutes in a compact arrangement by a simple bracket adapted to connect the chutes at different angles.

Referring now more particularly to the drawings, a sample arrangement of the chute structure is represented as set up compactly in a building having vertical H or other suporting beams 20 which may extend from a floor 22 to a ceiling 24 of a building and some of the parts may also be attached to a vertical wall 26 thereof. A number of angle braces 28, 30, 32 and 34 are variously connected to the beams 20, to each other and to wall plates 36 for supporting each other and also for supporting a number of chutes 38 of different lengths and at different angles with respect to the supporting structure. Each of these chutes preferably comprises a pair of angle bars 40 as shown in Fig. 2 suitably spaced apart and held in this position by transverse angle bars 42 attached to the supporting beams so that various articles of merchandise such as cans, boxes and packages may fit between the upright webs of the angle bars 40 and be supported upon parallel base webs of the angle bars for free sliding movement.

The chutes are variously inclined so that the merchandise rolls or slides by gravity down each individual chute and is discharged by a kick-out device 44 at the lower edge of each chute, the end of each chute being closed by a stop in the form of an angle bar 46 (Fig. 4) extending across the lower end of the chute just below the kick-out device.

The inclination of each chute determines the merchandise or articles that are dispensed therefrom, those that are round requiring very little chute inclination and the rectangular packages or boxes requiring more inclination depending somewhat upon their size, weight and contents.

There are banks of chutes usually similar as to length and inclination included between spaced supports 20, the chutes shown in Fig. 1 being those at one side only of the entire bank of such chutes connected to and spaced apart between adjacent supports 20 in any well known manner.

At the bottoms of the upper chutes 38 as shown in Fig. 1, there is an inclined guide 48 which may be secured at its upper end to one of the wall plates 36 and intermediate its ends, it is supported by a deep freeze or refrigerator 50 and by a brace 52 extending therefrom with a lower rounded portion 54 extending adjacent a bumper 56 connected to vertical supports 20 and extending across between adjacent supports in the path of material from this guide 48.

Below the bumper 56 is another inclined guide 58 extending downward in a direction opposite to that of the guide 48 with a bumper 60 at the lower end of this guide from which selected merchandise is delivered by means of a plate 62 to a conveyor belt 64 suitably mounted for movement upon rollers 66.

A lower section of chutes 38 may be mounted in the framework support to discharge below the bumper 56 upon the guide 58 and upon another inclined guide 68 which delivers them directly to one side of the conveyor belt 64.

Various arrangements of these chutes may be made in the framework which preferably consists of standard beams and angle bars of aluminum which is both light and strong, or other suitable material. The angle bars 40 which constitute the chutes are supported between the H beams 20 by T-bar cross pieces 70 preferably cut in length to fit between the beams and having a bracket 72 at each end adapted to engage the cross piece and support it at any desired angle and also adapted to be easily attached to any of the beam supports 20 at any position therealong.

Each bracket is adapted to loosely embrace one side of an H beam 20 by means of opposite channel-shaped edges 74 and fastening studs 76 which are threaded through the opposite side of the bracket and are adapted to engage the outer face of the beam opposite the overlapping engagement of the edges 74. The outer portion of the bracket is thus spaced from the outer face of the supporting beam 20 so that one end of the cross piece 70 may be inserted in a recess opening from the top of the bracket and seated therein at various angles by means of a transverse cut 78 in one head web of the bar 70, extending to the bottom of this web and by a transverse cut 80 extending in the tail web of the bar 70. These cuts 78 and 80 are spaced from the ends of the bar a sufficient distance to engage the edges of an irregular recess in the outer face of the bracket having an outer angular edge portion 82 terminating in a rounded projection 84 substantially opposite a vertical spaced abutment 86 to receive a bar 70 as shown in Fig. 9 with a rounded and gradually widening recess 88 extending from the sides of the projection 84 and from the side of the abutment 86, with the recess 88 substantially at a right angle to the angular portion 82 and at an inclination to the abutment 86 to provide a space at the narrowest portion of the recess to receive the vertical portion of the T-bar 70 therebetween as shown in Fig. 10.

With this construction, the bar 70 may be adjusted by any angle in the bracket within the limits in which the head is substantially flat and in which the head is at right angles to the inclined portion of the recess 88 which is below the angular projection 84 and enough points of contact are afforded by the slots 78 and 80 to keep the cross bar in engagement with the brackets at its ends to allow the adjustment of the cross piece at any of the angles within its limits and to maintain at least three points of the cross piece in contact with the slotted portion of the bracket to hold it in any adjusted position.

With this construction, the brackets 72 may be located at any desired level on opposite beams 20 and a cross bar 70 may be inserted from the top of the brackets and the slots 78 and 80 engage with the outer portion of the bracket, and the cross piece may then be set at any desired angle to support the chute angle bars 40 thereon.

The brackets 72 for opposite ends of the cross bars 70 are made in right and left pairs to engage the corresponding beams but the same punching die may be used for both brackets by reversing the die and when the brackets are thus engaged, the cross bars are held and anchored by engagement with the brackets and the merchandise chute bars 40 in contact therewith.

The same punching die as used for the brackets 72 may also be used in a bracket 90 in which the channel edges 92 extend transversely of the irregular perforation 94 in the outer face thereof, the angular portion 82, the rounded projection 84, the vertical abutment 86 and the recess 88 of which correspond to the similar portion of the bracket 72. This bracket 90 also has fastening screws 76 by means of which it may be attached to a web of a supporting beam 20, preferably one which is located in a horizontal position or slightly inclined thereto if a bar 70 is to be applied thereto. This bracket is particularly valuable in assembling cross pieces upon beams or supports which extend in a somewhat horizontal position.

Connecting frame parts which extend at various angles to the vertical beams 20 are shown in Figs. 12 and 13 in which an inclined supporting bar preferably H-shaped in section (or modified I-beam) 96 is connected by similar offset end clips 98 which are connected to the extremity of the bar 96 by fastening studs 100 either with or without the addition of fastening nuts 102. The extremities 104 of these clips extend together and have perforations through which a bolt 106 is inserted. This bolt also passes through perforations in the ends of offset straps 108 adapted to embrace the opposite sides of a beam 20 and to have the adjacent ends 110 extending together so that the fastening bolt 106 may be inserted through registering perforations in the ends 110 to bind the plates tightly against the opposite sides of the beam 20 and also to pivotally mount the beam 96 at any desired inclination with respect thereto. The braces 28, 30, 32 and 34 as shown in Fig. 1 are connected in this manner to the vertical beams 20 and for supporting some of the chutes, the brackets 90 are attached to the braces or beams 96 for engagement of cross beams 70 in the opposite recesses 94 of right and left brackets 90 which operate similarly to the bracket 72 as above described.

At the end of each merchandise chute comprising angle bars 40 and connecting stop bar 46 at the end thereof is a knock-out device comprising a plunger 112 movable upwardly into a solenoid winding 114 having a core 116. A stem 118 extends from the plunger through a sleeve 120 in the upper portion of the core so that when the winding is energized, the plunger will be drawn sharply upward projecting the top of the stem 118 through the sleeve 120 and into engagement with a kick plate 122 connected by a hinge 124 with a casing 126. This casing has a frame extension 128 projecting below the lower web of the angle bar 46 to which it is secured by one or more lock screws for the larger sizes, the kick plate 122 being positioned between the inner edges of the side angle bars 40 so that the top of the kick plate is flush with or below the inwardly extending sides of the bars 40 which form the chute.

At the under side of the kick plate 122 is a curved arm 132 which extends through an opening 134 in the casing 126 and projects into a space enclosed by casing parts 136. At the outer end of this arm is an angular projection 138 which is larger than the opening 134 so that the outward movement of the kick plate is limited by the engagement of this projection 138 with one side of the opening 134 of the casing. The casing 126 has a lower extension 140 below the solenoid and its armature with a pad 142 mounted thereon in the downward path of the plunger 112 which may be provided with extending feet 144 secured to the lower end of the plunger by a bolt or rivet 146 and providing additional contact engagement with the pad 142.

When chutes are nearly empty of merchandise so that only a few cans or boxes are at the bottom of the chute, a normally closed micro-switch 148 has an arm 150 which projects into the path of the merchandise and in the direction of movement of the merchandise upon the chute. This switch is held in an open position by the weight of merchandise thereon, but as soon as the arm is free from engagement by the merchandise, the arm is raised closing the switch 148 and closing a circuit to an indicating lamp 152, at the upper end of the chute to indicate to an attendant that the merchandise in this chute is running low. This lamp illuminates a colored button 154 carried by a plate 156 overlying the lamp and at the outside of the plate is a bracket 158 for receiving a label 160 therein which designates the merchandise contained in that chute.

With this construction, the chutes 38 of various lengths are supported between the vertical supporting beams 20 by cross pieces 70 which are adapted either to be mounted in brackets 72 on the spaced vertical H beams and at various angles to accommodate the chutes, or the various angle braces 28, 30, 32 and 34 are provided with brackets 90 which have the same die cut openings for engaging the edges of the cross bars 70 at different angles. By this means, the same cross bars and the same brackets 72 and 90 may be used for supporting the delivery chutes at the various different angles which may be required for discharging the merchandise therefrom.

In locating the ejection unit or kick-out device near the discharge end of each chute, the kick-plate 122 is positioned below the center of any particular article and the action of the magnet in raising the kick-plate moves the article of merchandise upwardly over the end stop bar 46 and the sliding or rolling weight of the articles in the chute above the bottom article which is discharged causes it to be thrown outwardly over the end of the stop bar 46 and to drop either directly upon the conveyor or against one of the partitions or guides by which it is conducted to the conveyor. This ejection unit requires no springs because the angle at which the unit is mounted for operation is always such that the weight of the kick plate and the plunger will return them to their rest positions.

The end guard rail or stop bar 46 will retain all other articles in the chute until the kick plate is again operated, the kick plate being returned by gravity and also by engagement of the next article in the chute to its normal position at the end of the chute. The stop bar 46 for round cans must be higher than for square or oblong boxes of merchandise, but if this guard rail is too high, over two-fifths of the diameter of the can, the efficiency of the kick-out device is reduced because the air gap in the solenoid must be large enough to permit a plunger stroke which will eject the can with enough force to lift it over the stop bar. Two things are taken into account: the weight of the can and the diameter of the can, to compensate for the back pressure by a number of cans and their weight, and to lessen the thrust against the guard rail which holds the cans back, the chute angle must be such that cans will not jump over the guard rail because of this back pressure and the number of cans once the ejection of the cans has commenced and the whole chute full of cans is put in motion. Here again there are two forces: the forces due to momentum and the force of gravity. The latter determines by the angle of the chute how quickly the succeeding can is moved into place for ejection.

This system provides for not less than two items to be ejected per second and the chute should be adjusted at such an angle that succeeding cans arrive in position for ejection in less than one-half a second. No momentum of the cans in the chute should be present when the next ejection of one of the articles therein occurs. All cans should be always at a complete standstill when the next following ejection of merchandise occurs. Thus a delicate balance must be established between these several factors: (a) motion or momentum; (b) proper angle of the chute; (c) diameter of the can; (d) weight of can and contents; and (e) height of stop bar guard so that as small a solenoid as possible can be used for ejection purposes. When these factors are taken into account, a mathematical formula may be devised to establish the pitch or angle at which the chutes must be adjusted to work in the most efficient manner for ejection purposes with the smallest ejection solenoid.

One reason that excessive pressure does not develop on round cans is that a positive and negative rolling action develops as they travel downward in the chutes which acts as a brake one against the other. For this reason, it is possible to have chutes as long as 16 feet or more which will hold from 50–100 cans depending upon the size or diameter of the can.

Square and oblong boxes containing soups, candy, packaged marcaroni, small jars of peanut butter, small bottles of "Danderine" and other similar merchandise require a steeper angle in the discharge chute in order to feed the merchandise downward. The larger the size of the box, like a large package of washing compound which may be approximately 8 x 11 inches and weighing 3 to 4 pounds, the longer the time element for the next carton to arrive at the point of ejection. The motion, weight, gravity and back pressure caused by the weight and number of boxes in the chutes must be taken into consideration and can be controlled by the pitch or angle of the chute. The friction of a box is used as a retarding factor and reduces the back pressure. Increased resistance of longer cartons must also be taken into account and guards or retainers may be reduced depending upon the motion, size and weight of the carton balanced against its gravity in the chute so that the smallest possible ejecting solenoid can be used.

By having three different sizes of solenoids, using an air gap of from ¾" to 1" and solenoids having respectively a power of 3, 7½ and 18 pounds of push with the plunger ¼" from the seat, different items can be successfully ejected weighing less than one ounce, either round, square, or oblong containers; large boxes, 5 pounds or more of merchandise, sizes 12" to 16" and larger from chutes 5 to 16 feet in length at different angles and pitches.

While this merchandise selecting system with the erection of a plurality of chutes at different angles, the means for supporting the chutes at various angles with one simple type of adjustable cross rail, the ejection of merchandise from the lower end of each chute and the indication of the necessity of replenishing articles in the chute have all been described in some detail and these features should be regarded as illustrations or examples of the invention and not as restrictions or limitations thereof as various changes may be made in the construction, combination and arrangement of the parts without departing from the spirit and scope of the invention.

I claim:

1. In a merchandise selecting system a plurality of inclined chutes for containing merchandise to be discharged by gravity and at the lower end thereof, adjustable structural means to support the chutes at different inclinations, a stop at the lower end of each chute to engage the lowermost article of merchandise therein, an electro-responsive kick-out device adjacent the lower end of each chute having a plunger at right angles to the chute and a pivoted operating plate directly moved thereby to engage the under edge of the lowermost article in the chute at a distance from the stop and to eject it over the stop, said structural means comprising fixed vertical supports having engageable flanges and spaced apart to receive a plurality of the said inclined chutes therebetween, a T-bar cross piece to fit between adjacent supports, a bracket at each end of each cross piece to engage the flange of the adjacent support, means to releasably secure the bracket to the support, the bracket having a recess therein for engaging and seating the end of the cross piece at different angles and the chutes engaging the cross pieces and inclinable at various angles therewith.

2. In a merchandise selecting system in accordance with claim 1, each bracket having means for embracing the said flange and spacing the bracket from the outer side of the support, and each end of the cross piece having a transverse notch which engages on both sides of the projecting spaced portion of the bracket for variably inclining it when the end of the cross piece is seated in said recess in the bracket.

3. In a merchandise selecting system in accordance with claim 2, the bracket having opposite engaging edges to extend around opposite flanges of the support and said releasably securing means comprising fastening screws inserted through the outer portion of the bracket to engage and space it away from the adjacent face of the support, and the cross piece having a notch at each end at a distance equal to the space of the outer portion of the bracket from the face of the support so that the notched ends of the cross piece will be seated in the recesses, the sides of the notch engaging the inner and outer faces of the said spaced portion of the bracket.

4. In a merchandise selecting system in accordance with claim 2, the cross piece being T-shaped in cross section and having notches adjacent the ends thereof for engaging the said opposite sides of the projecting portion of the bracket and seated in the said recess of the bracket, the recess having an irregular and somewhat angular shape so that the cross piece end engaged therein may be adjusted from a substantially vertical position to a position at an angle thereto but making supporting contacts with the edges of the recess at all times and the sides of the notches engaging the opposite sides of the projecting portion of the bracket at the corresponding edges of the recess.

5. In a merchandise selecting system in accordance with claim 4, the brackets comprising right and left pairs for engaging supports at opposite ends of the cross piece, the cross piece being angularly adjustable in the recesses from a substantially vertical position to an inclined position less than at right angles thereto and each recess having an angular portion at the top and a rounded extension at the lower end of the angular portion for making a plurality of supporting engagements with each slotted end of the cross piece in any angular position in which it is adjusted with respect to the brackets.

6. In a merchandise selecting system in accordance with claim 5, a right and left pair of brackets having channel edges to engage over the flanges of a structural beam support and in which the cross piece engaging recess extends from one channel edge of the bracket in the outer portion thereof, the slotted end of the cross piece being insertable into this recess and engaging the said angular portion and rounded extension of the recess and being adjustable therein at different angles in the recess but maintaining engagement of the notches thereof with the inner and outer faces of the bracket at the edges of the recess.

7. In a merchandise selecting system in accordance with claim 1, the structural means comprising vertical supports and other supports disposed at an angle to the vertical supports, means to connect the said other supports at various different angles to the vertical supports, the cross pieces having similar right and left brackets for attaching the ends of the cross pieces to the angular supports as well as to the vertical supports and thereby supporting the chutes of any cross piece at any desired location and inclination transversely of the said supports.

References Cited in the file of this patent

UNITED STATES PATENTS

| | | |
|---|---|---|
| 723,119 | Von Zweigbergk | Mar. 17, 1903 |
| 1,351,589 | Vons | Aug. 31, 1920 |
| 1,514,389 | McClellan | Nov. 4, 1924 |
| 1,677,938 | Von Sickle | July 24, 1928 |
| 1,694,515 | Nutting | Dec. 11, 1928 |
| 1,774,223 | Beucler | Aug. 26, 1930 |
| 1,981,783 | De Bussey | Nov. 20, 1934 |
| 2,008,735 | Weiler | July 23, 1935 |
| 2,071,770 | Shield | Feb. 23, 1937 |
| 2,160,102 | Hull | May 30, 1939 |
| 2,176,384 | Varney | Oct. 17, 1939 |
| 2,189,641 | Slezak | Feb. 6, 1940 |
| 2,276,293 | Farmer | Mar. 17, 1942 |
| 2,304,455 | Guerard | Dec. 8, 1942 |
| 2,353,394 | Farmer | July 11, 1944 |
| 2,427,321 | Casey et al. | Sept. 9, 1947 |
| 2,443,871 | Shield | June 22, 1948 |
| 2,599,907 | Farmer | June 10, 1952 |
| 2,660,282 | Gross | Nov. 24, 1953 |
| 2,669,139 | Finch | Feb. 16, 1954 |
| 2,669,361 | Just | Feb. 16, 1954 |
| 2,698,699 | Skillman | Jan. 4, 1955 |